United States Patent
Hoffmann et al.

(10) Patent No.: US 12,286,551 B2
(45) Date of Patent: Apr. 29, 2025

(54) COATING COMPOSITIONS CONTAINING (METH)ACRYLIC RESINS HAVING SILANE GROUPS

(71) Applicant: BASF Coatings GmbH, Münster (DE)

(72) Inventors: Peter Hoffmann, Münster (DE); Emre Levent, Münster (DE); Jan Zaminer, Münster (DE); Yvonne Casanova Sanchez, Münster (DE); Kristin Michel, Münster (DE); Natalja Ott-Arens, Münster (DE); Friederike Mittag, Münster (DE)

(73) Assignee: BASF COATINGS GMBH, Muenster (DE)

( * ) Notice: Subject to any disclaimer, the term of this patent is extended or adjusted under 35 U.S.C. 154(b) by 640 days.

(21) Appl. No.: 17/630,380

(22) PCT Filed: Jul. 29, 2020

(86) PCT No.: PCT/EP2020/071358
§ 371 (c)(1),
(2) Date: Jan. 26, 2022

(87) PCT Pub. No.: WO2021/018945
PCT Pub. Date: Feb. 4, 2021

(65) Prior Publication Data
US 2022/0282114 A1 Sep. 8, 2022

(30) Foreign Application Priority Data
Jul. 29, 2019 (EP) .................................. 19188915

(51) Int. Cl.
| | | |
|---|---|---|
| *C09D 143/04* | (2006.01) | |
| *B05D 7/00* | (2006.01) | |
| *C08F 4/48* | (2006.01) | |
| *C08F 212/08* | (2006.01) | |
| *C08F 220/18* | (2006.01) | |
| *C08F 230/08* | (2006.01) | |
| *C08K 5/01* | (2006.01) | |

(52) U.S. Cl.
CPC ............ *C09D 143/04* (2013.01); *B05D 7/53* (2013.01); *C08F 4/482* (2013.01); *C08F 212/08* (2013.01); *C08F 220/1804* (2020.02); *C08F 220/1806* (2020.02); *C08F 230/085* (2020.02); *C08K 5/01* (2013.01); *B05D 2425/01* (2013.01)

(58) Field of Classification Search
CPC .. C09D 133/10; C09D 143/04; C09D 201/10; C08F 4/482
USPC ....................................................... 525/326.5
See application file for complete search history.

(56) References Cited

U.S. PATENT DOCUMENTS

| | | |
|---|---|---|
| 4,614,777 A | 9/1986 | Kania |
| 5,356,996 A | 10/1994 | Nakao et al. |
| 2011/0118406 A1 | 5/2011 | Mowrer et al. |
| 2012/0045586 A1 | 2/2012 | Hoffmann et al. |

OTHER PUBLICATIONS

International Search Report and Written Opinion for corresponding PCT/EP2020/071358 mailed Oct. 27, 2020, 10 Pages.

*Primary Examiner* — Fred M Teskin
(74) *Attorney, Agent, or Firm* — Armstrong Teasdale LLP

(57) ABSTRACT

Described herein is a coating composition including one or more (meth)acrylic polymers including moieties of formula (I)

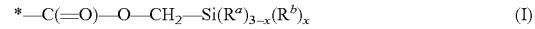

$$*-C(=O)-O-CH_2-Si(R^a)_{3-x}(R^b)_x \qquad (I)$$

where $R^a$=methoxy; $R^b$=an alkyl group containing 1 to 4 carbon atoms or an alkoxy group containing 1 to 4 carbon atoms; x is 0 or 1; and the asterisk * denotes the position at which the moiety of formula (I) is attached to the polymeric backbone of the (meth)acrylic polymer; further containing one or more catalysts of formula (II)

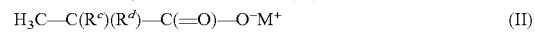

$$H_3C-C(R^c)(R^d)-C(=O)-O^-M^+ \qquad (II)$$

where $R^c$ and $R^d$=alkyl groups containing 1 to 6 carbon atoms, with the proviso that the sum of the number of carbon atoms in residues $R^c$ and $R^d$ ranges from 2 to 7, and M=for Li, K or Na, and further containing one or more aprotic organic solvents.

17 Claims, No Drawings

COATING COMPOSITIONS CONTAINING (METH)ACRYLIC RESINS HAVING SILANE GROUPS

CROSS-REFERENCE TO RELATED APPLICATIONS

This application is a U.S. National Phase Application of International Patent Application No. PCT/EP2020/071358, filed Jul. 29, 2020, which claims priority to European Patent Application No. 19188915.3, filed Jul. 29, 2019, the entire contents of which are hereby incorporated by reference herein.

The present invention relates to coating compositions, particularly clear coat compositions based on hydrolysable silane group containing (meth)acrylic polymers. The invention further relates to a method of coating substrates with the coating compositions of the present invention and thus coated substrates.

BACKGROUND

In most conventional coating systems cross-linking of binders is achieved by isocyanate chemistry or by using aminoplast resins. However, aminoplast resin based cross-linking and crosslinking with blocked isocyanates typically require relatively high crosslinking temperatures. Therefore, such systems are not suitable where low temperature cure is required. On the other hand, the use of free isocyanates as crosslinkers, requires high environmental and occupational safety precautions.

Therefore, there is a continuing demand for coating compositions which form highly crosslinked, fast curing coating compositions, which cure at temperatures well below 100° C. and form coatings which exhibit a satisfactory hardness as well as scratch and solvent resistance without the need of using isocyanate and/or aminoplast resin based crosslinkers.

An attempt to provide coating compositions without isocyanate and/or aminoplast chemistry is based on making use of silane-crosslinking chemistry. It is well-known that hydrolysable silanes are apt to form stable inorganic Si—O—Si networks providing rigid surface coatings.

In some applications, e.g. in the production of sealants or adhesives, hydrolysable silane groups are attached to organic polymers such as polyethers or polyurethanes. Such modified organic polymers crosslink under formation of elastomeric products.

In further applications, hydrolysable amino silanes are reacted with polyisocyanates, fully or partially consuming the isocyanate groups. The resulting compounds can for example be used as crosslinking agents for crosslinking hydroxyl functional organic polymers such as (meth)acrylic resins.

US 2012/045586 A1 discloses moisture-curing coating compositions based on aprotic solvents, comprising at least one binder having alkoxysilane groups and at least one crosslinking catalyst.

U.S. Pat. No. 5,356,996 A discloses a coating composition including an acrylic polymer prepared by copolymerizing an alkoxysilane-containing vinyl monomer and an amino resin. The coating is curable at low temperatures.

Furthermore, U.S. Pat. No. 4,614,777 A discloses addition interpolymers that can be included in coating compositions as the main film former enabling the curing at low temperatures. The interpolymers are prepared using isobornyl (meth)acrylate and contain silane groups.

US 2011/118406 A discloses a one-component low temperature, moisture curable coating composition comprising a silanol-functional silicone, an alkoxy-functional silicone, a flexibilizer comprising a reaction product of two or more reactants and a curing agent.

However, in many cases the crosslinking efficiency is limited due to insufficient catalysis, leading to slow curing, sometimes tacky films, low resistance to solvents and scratches.

It was the aim of the present invention to provide fast curing coating compositions based on silane crosslinking, which cure at low temperatures, without making use of isocyanate crosslinkers or aminoplast crosslinker, and providing solvent resistant cured coatings exhibiting scratch resistance. Furthermore, tin or other heavy metal containing catalysts should be avoided.

SUMMARY

The above aim was achieved by providing a coating composition comprising
(A) one or more (meth)acrylic polymers comprising moieties of formula (I)

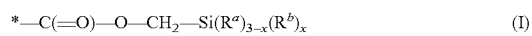
$$*-C(=O)-O-CH_2-Si(R^a)_{3-x}(R^b)_x \quad (I)$$

wherein
$R^a$ is a methoxy group,
$R^b$ is an alkyl group containing 1 to 4 carbon atoms or an alkoxy group containing 1 to 4 carbon atoms,
x being 0 or 1, and
the asterisk * denoting the position at which the moiety of formula (I) is attached to the polymeric backbone of the (meth)acrylic polymer;
(B) one or more catalysts of formula (II)

$$H_3C-C(R^c)(R^d)-C(=O)-O^-M^+ \quad (II)$$

wherein
$R^c$ and $R^d$ independently are alkyl groups containing 1 to 6 carbon atoms, with the proviso that the sum of the number of carbon atoms in residues $R^c$ and $R^d$ ranges from 2 to 7, and M denotes for Li, K or Na; and
(C) one or more aprotic organic solvents.

In the following the above coating composition is referred to as "coating composition according to the invention".

The term "(meth)acrylic" as used herein stands for "acrylic" and "methacrylic". Likewise, a "(meth)acrylic polymer" comprises acrylic and/or methacrylic monomers in polymerized form. However, besides the afore-mentioned acrylic and/or methacrylic monomers, further ethylenically unsaturated monomers such as styrene can be comprised in the (meth)acrylic polymer.

A further object of the present invention is a method of coating a substrate with the coating compositions according to the invention, the method comprising
a. applying the coating composition according to the present invention onto a substrate to form a coating layer; and
b. curing the coating layer at a temperature in the range from 20° C. to 100° C.

In the following the above method is referred to as "method according to the invention".

Another object of the present invention is a coated substrate obtainable according to the method according to the present invention.

Yet another object of the present invention are a multilayer coating and a multilayer coated substrate.

DETAILED DESCRIPTION

Coating Composition

The coating composition according to the present invention comprises at least one (meth)acrylic polymer comprising moieties of formula (I) above, a catalyst of formula (II) above and one or more aprotic solvents, and are most preferably clear coat compositions.

(Meth)acrylic Polymer (A)

The (meth)acrylic polymers of the present invention can be synthesized using any known polymerization technique on this field. Particularly continuous or batchwise free-radically initiated copolymerization in bulk, solution, emulsion, mini-emulsion or micro-emulsion under atmospheric or superatmospheric pressure in stirred tanks, autoclaves, tube reactors, loop reactors or Taylor reactors at temperatures of preferably from 50 to 200° C.

Examples of suitable copolymerization techniques are described in Patent Applications DE 197 09 465 A1, DE 197 09 476 A1, DE 28 48 906 A1, DE 195 24 182 A1, DE 198 28 742 A1, DE 196 28 143 A1, DE 196 28 142 A1, EP 0 554 783 A1, WO 95/27742, WO 82/02387 or WO 98/02466.

Examples of suitable free-radical initiators are dialkyl peroxides, such as di-tert-butyl peroxide or dicumyl peroxide; hydroperoxides, such as cumene hydroperoxide or tert-butyl hydroperoxide; peroxo esters, such as tert-butyl peroxo benzoate, tert-butyl peroxo pivalate, tert-butylperoxo-3,5,5-trimethylhexanoate or tert-butyl peroxo-2-ethylhexanoate; or peroxodicarbonates; potassium, sodium or ammonium peroxodisulfate. It is also possible to employ combinations of the initiators described above.

It is preferred to add comparatively large amounts of free-radical initiator, the amount of the initiator, based on the total amount of the monomers and of the initiator, being preferably from 0.2 to 20 wt. %, more preferred from 0.5 to 15 wt. %.

The ethylenically unsaturated monomers employed in the preparation of the (meth)acrylic polymer (A) are preferably monoethylenically unsaturated monomers. The ethylenically unsaturated group being selected from the group consisting of (meth)acrylic groups and vinyl groups.

Attached to the polymeric backbone of the (meth)acrylic polymer are moieties of formula (I)

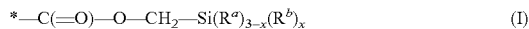

$$*-C(=O)-O-CH_2-Si(R^a)_{3-x}(R^b)_x \quad (I)$$

wherein
$R^a$ is a methoxy group;
$R^b$ is
i. an alkyl group containing 1 to 4 carbon atoms, preferably 1 or 2, most preferred 1 carbon atom or
ii. an alkoxy group containing 1 to 4 carbon atoms, preferably 1 or 2 carbon atoms, most preferred 1 carbon atom;
x=0 or 1, preferably x=0, and the asterisk * denotes the position at which the moiety of formula (I) is attached to the polymeric backbone of the (meth)acrylic polymer.

In a preferred embodiment $R^b$ is a methyl group or an alkoxy group having 1 or 2 carbon atoms, even more preferred $R^b$ is alkoxy group having 1 or 2 carbon atoms, most preferred x=0.

The above moieties of formula (I) can be introduced by polymerizing (meth)acrylic acid esters of a hydrolysable hydroxymethyl silane, the polymerizable (meth)acrylic monomer having formula (Ia)

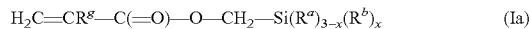

$$H_2C=CR^g-C(=O)-O-CH_2-Si(R^a)_{3-x}(R^b)_x \quad (Ia)$$

wherein $R^a$, $R^b$ and x being as defined in formula (I), and $R^g$ being H or $CH_3$. Preferably $R^g$ is methyl.

Such monomers of formula (I) are e.g. commercially available from Wacker under the trademark Geniosil® XL 33 and Geniosil® XL 32.

Further ethylenically unsaturated moieties, which are attached to the polymeric backbone of the (meth)acrylic polymer are preferably presented by formula (III)

$$*-C(=O)-O-R^e \quad (III);$$

wherein, $R^e$ denotes a hydrocarbyl group selected from the group consisting of linear or branched alkyl groups, preferably containing 1 to 18 carbon atoms, more preferably 2 to 12 carbon atoms, more preferred 3 to 8 carbon atoms, such as 4 carbon atoms;
cycloalkyl groups, preferably containing 3 to 8 carbon atoms, more preferably 4 to 6 carbon atoms such as 6 carbon atoms;
aryl groups, preferably containing 6 to 12 carbon atoms, preferably 6 to 10 carbon atoms, such as 6 to 8 carbon atoms; and
aralkyl groups, preferably containing 7 to 12 carbon atoms, more preferably 7 to 10 carbon atoms; or
$R^e$ denotes an alkoxyalkyl group, preferably containing 1 to 6 carbon atoms in the alkoxy residue of the alkoxyalkyl group and 2 to 6 carbon atoms in the alkyl residue of the alkoxyalkyl group; and
the asterisk * denoting the position at which the moiety of formula (III) is attached to the polymeric backbone of the (meth)acrylic polymer.

Preferably, if the $R^e$ group is a hydrocarbyl group, $R^e$ denotes a hydrocarbyl group selected from the group consisting of alkyl groups containing 1 to 8 carbon atoms and cycloalkyl groups containing 3 to 8 carbon atoms.

The above moieties of formula (III) can be introduced by polymerizing (meth)acrylic acid esters of monoalcohols, the polymerizable (meth)acrylic monomer having of formula (IIIa)

$$H_2C=CR^g-C(=O)-O-R^e \quad (IIIa)$$

wherein $R^e$ being as defined in formula (III), and $R^g$ being H or $CH_3$. Preferably $R^g$ is methyl.

To produce (meth)acrylic polymers (A) having a high glass transition temperature, e.g. above 0° C., preferably above 10° C., it is preferred to use cycloaliphatic residues $R^e$ such as cyclohexyl groups. If, however, (meth)acrylic polymers (A) having a low glass transition temperature are desired, e.g. below 0° C., preferably above −10° C. or even below −20° C., aliphatic residues such as alkyl groups, like methyl, ethyl, propyl, butyl, pentyl or hexyl groups are preferred.

Further ethylenically unsaturated moieties, which are preferably attached to the polymeric backbone of the (meth) acrylic polymer are preferably presented by formula (IV)

$$*-R^f \quad (IV)$$

$R^f$ denoting for an aryl group containing 6 to 10 carbon atoms such as a phenyl group, and the asterisk * denoting the position at which the moiety of formula (IV) is attached to the polymeric backbone of the (meth)acrylic polymer.

The moieties of formula (IV) origin preferably from a vinyl monomer of formula (IVa)

$$H_2C=CR^g-R^f \quad (IVa)$$

$R^f$ being as defined in formula (IV), and $R^g$ being H or $CH_3$. Preferably $R^g$ is hydrogen.

Beside the afore-mentioned types of monoethylenically unsaturated monomers of formulas (Ia), (IIIa) and (IVa) further monoethylenically unsaturated monomers can be employed in the production of the (meth)acrylic polymer (A), such as hydroxyalkyl (meth)acrylates, like 2-hydroxyethyl (meth)acrylate, 2-hydroxypropyl (meth)acrylate and 4-hydroxybutyl (meth)acrylate; or such as alkyl-2-hydroxymethyl acrylates like methyl-2-hydroxymethyl acrylate, ethyl-2-hydroxymethyl acrylate and butyl-2-hydroxymethyl acrylate; or such as (meth)acrylic acid; or such as aminoalkyl (meth)acrylates.

However, preferably the (meth)acrylic polymer (A) does not contain monoethylenically unsaturated monomers containing hydroxyl, amino or carboxyl groups, such as in particular hydroxyl functional (meth)acrylates, amino functional (meth)acrylates or carboxy functional (meth)acrylates.

Preferably the monoethylenically unsaturated monomers of formulas (Ia), (IIIa) and (IVa) sum up to at least 80 wt. %, more preferred at least 90 wt. % and most preferred at least 95 wt. % or 100 wt. % of all ethylenically unsaturated monomers employed in the production of the (meth)acrylic polymer (A). If the amount of monoethylenically unsaturated monomers of formulas (Ia), (IIIa) and (IVa) does not sum up to 100 wt. % the residual amount to 100 wt. % is constituted by the further monoethylenically unsaturated monomers differing from formulas (Ia), (IIIa) and (IVa), as described above.

The (meth)acrylic polymer (A) is obtainable by polymerizing a mixture of
i. monomers of formula (Ia), preferably in an amount of 20 to 60 wt. %, more preferred 25 to 55 wt. % and most preferred 30 to 50 wt. %;
ii. monomers of formula (IIIa), preferably in an amount of 25 to 65 wt. %, more preferred 30 to 60 wt. % and most preferred 35 to 58 wt. %; and
iii. monomers of formula (IVa), preferably in an amount of 5 to 25 wt. %, more preferred 10 to 20 wt. % and most preferred 12 to 18 wt. %;
the amounts of monoethylenically unsaturated monomers of formulas (Ia), (IIIa) and (IVa) summing up to preferably at least 80 wt. %, more preferred at least 90 wt. % and most preferred at least 95 wt. % or 100 wt. %, based on the total weight of ethylenically unsaturated monomers employed in the polymerization to obtain the (meth)acrylic polymer (A).

By varying the amounts of monomers of formula (Ia) it is possible to influence the crosslinking density and hardness of the coatings. The higher the amount of monomers of formula (Ia), the higher the crosslinking density. However, if the amount exceeds 60 wt. % based on the total weight of ethylenically unsaturated monomers employed in the polymerization to obtain the (meth)acrylic polymer (A), the resulting crosslinked films tend to crack. If the amount is lower than 20 wt. % based on the total weight of ethylenically unsaturated monomers employed in the polymerization to obtain the (meth)acrylic polymer (A), the resulting films have an insufficient hardness and consequently an insufficient scratch resistance.

If the amount of monomers of formula (Ia) is changed, it is preferred to increase or decrease the amount of monomers of formula (IIIa) to compensate the change.

The (meth)acrylic polymer (A) is preferably a random copolymer. However, other polymer architectures are also possible as e.g. a gradient structure or block structure.

The amount of the (meth)acrylic polymer (A), based on the total weight of the coating composition preferably ranges from 35 to 60 wt % and most preferred from 40 to 50 wt. %.

The amount of (meth)acrylic polymer (A) employed in the coating composition according to the present invention is determined by drying a portion (approximately 1 to 2 g) of the reaction mixture obtained in the production of (meth) acrylic polymer (A) for 1 hour at 130° C. The average of three determinations is used as solids content of the (meth) acrylic polymer (A) in the reaction mixture.

It is preferred that the (meth)acrylic polymer (A) and the catalyst are combined just before use of the coating composition to avoid pre-mature crosslinking. After combining both, the coating composition should preferably be used within 30 minutes.

Catalyst (B)

The catalyst used in the coating compositions of the present invention is an alkali metal salt of a branched carboxylic acid of formula (II)

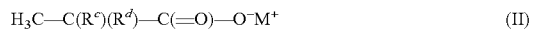

$$H_3C-C(R^c)(R^d)-C(=O)-O^-M^+ \qquad (II)$$

wherein, $R^c$ and $R^d$ are alkyl groups containing 1 to 6 carbon atoms, with the proviso that the sum of the number of carbon atoms in residues $R^c$ and $R^d$ ranges from 2 to 7, and M is Li, K or Na, preferably Li.

The most preferred catalysts (B) are the alkali metal salts of neodecanoic acid, particularly preferred is lithium neodecanoate.

Typically, the catalysts of formula (II) are supplied by manufacturers in acid stabilized form, such as DUROCT Lithium 2 (from DURA, Madrid). It is preferred to use such acid-stabilized catalysts of formula (II) not only because of their higher storage stability, but also because they introduce free acid into the coating composition according to the present invention. The stabilizing acid is generally the same as the branched free carboxylic acid which corresponds to the catalyst of formula (II). If the supply form of the catalyst contains $H_3C-C(R^c)(R^d)-C(=O)-OH$, the content of this acid is subsumed under the carboxylic acids (D) of formula (V) as described below.

The amount of catalyst (B), based on the amount of (meth)acrylic polymer (A) employed in the coating composition preferably ranges from 0.3 to 40 mmol, more preferred from 1.0 to 30 mmol and most preferred from 10 to 20 mmol per 100 g of (meth)acrylic polymer (A).

Aprotic Organic Solvents (C)

The coating compositions according to the present invention contain one or more aprotic solvents. The aprotic solvents in the coating composition are chemically inert toward the (meth)acrylic polymer (A), i.e. they do not react with (A) when the coating composition is cured.

Examples of such solvents are aliphatic and/or aromatic hydrocarbons, such as toluene, xylene, solvent naphtha, Solvesso 100 or Hydrosol® (from APAL), ketones, such as acetone, methyl ethyl ketone or methyl amyl ketone, esters, such as ethyl acetate, butyl acetate, pentyl acetate or ethyl epoxypropionate, ethers, or mixtures of the afore-mentioned solvents. The aprotic solvents or solvent mixtures preferably have a water content of not more than 1% by weight, more preferably not more than 0.5% by weight, based on the solvent.

The coating compositions according to the present invention are preferably substantially water-free and free from protic organic solvents (less than 0.5 wt. %, preferably less than 0.05 wt. % of water and/or protic organic solvents, based on the total weight of the coating composition). However, some additives or catalysts used herein are sold in protic organic solvents, therefore, in some cases, it cannot be avoided to introduce some unwanted protic solvents, unless a solvent exchange is carried out before their use. If the amount of such protic solvents is kept in the above limits, such amounts can typically be neglected. If undesired premature crosslinking occurs due to the presence of protic solvents, e.g. introduced by additives, such additives are preferably introduced into the coating composition just prior to the application of the coating composition. Another possibility is to perform a solvent-exchange.

The aprotic solvents are typically introduced by using a solution or dispersion of the (meth)acrylic polymer in an aprotic solvent or mixtures of aprotic solvents. Further parts of the aprotic solvent(s) are introduced to adjust the viscosity of the coating composition to a suitable application viscosity.

Preferably the amount of the aprotic organic solvent (C) is at least 25 wt. % based on the total weight of the coating composition, the upper limit is determined by the amount of the other ingredients, all ingredients including the aprotic organic solvent (C) adding up to 100 wt. %. More preferred the amount of the aprotic organic solvent (C) is from 30 wt. % to about 64 wt. %, even more preferred from 40 wt. % to 60 wt. % and most preferred from 45 wt. % to 55 wt. %, all wt. % values being based on the total weight of the coating composition.

Carboxylic Acids (D)

Preferably the coating composition of the present invention further contains one or more carboxylic acids of formula (V)

$$H_3C-C(R^h)(R^i)-COOH \quad (V)$$

wherein $R^h$ and $R^i$ denote alkyl groups containing 1 to 6 carbon atoms, with the proviso that the sum of the number of carbon atoms in residues $R^h$ and $R^i$ ranges from 2 to 7.

Particularly preferred the carboxylic acid of formula (V) is the free carboxylic acid which corresponds to the catalyst of formula (II). Most preferred the carboxylic acid (D) is introduced by using acid stabilized catalysts (B).

If contained, the amount of carboxylic acids (D), based on the total weight of the coating composition, ranges preferably from 0 to 8 wt. %, more preferably from 1 to 6 wt. % and in particular from 2 to 5 wt. %.

Additives (E)

The coating composition of the invention may further comprise at least one customary and known coatings additive in typical amounts, i.e., in amounts preferably from 0 to 20 wt. %, more preferably from 0.005 to 15 wt. % and in particular from 0.01 to 10 wt. %, based in each case on the total weight of the coating composition. The before-mentioned weight-percentage ranges apply for the sum of all additives likewise.

Examples of suitable coatings additives are in particular UV absorbers; light stabilizers such as HALS compounds, benzotriazoles or oxalanilides; free-radical scavengers; slip additives; polymerization inhibitors; defoamers; wetting agents such as siloxanes, fluorine compounds, adhesion promoters; leveling agents; film-forming auxiliaries such as cellulose derivatives; fillers, such as nanoparticles based on silica, alumina or zirconium oxide; for further details refer to Römpp Lexikon "Lacke and Druckfarben", George Thieme Verlag, Stuttgart, 1998, pages 250 to 252; rheology control additives such as those from patents WO 94/22968, EP-A-0 276 501, EP-A-0 249 201 or WO 97/12945; cross-linked polymeric micro-particles, as disclosed for example in EP-A-0 008 127; inorganic phyllosilicates such as aluminum magnesium silicates, sodium magnesium and sodium magnesium fluorine lithium phyllosilicates of the montmorillonite type; silicas such as Aerosils®; organic thickeners; and/or flame retardants.

It is also possible to add further catalysts, in the above additive amounts, which are different from the catalysts (C). For example, other salts of the carboxylic acid (D), such as bismuth salts thereof can be added. Preferably no further catalysts are used.

It is further possible to add hydroxyl functional binders, in the above additive amounts, such as (meth)acrylic polyols, polyester polyols or polyurethane polyols to the coating compositions. However, it is preferred, if the coating composition according to the present invention does not contain hydroxyl functional binders.

Method of Coating a Substrate

Further object of the present invention is a method of coating a substrate with the coating compositions according to the invention, the method comprising applying the coating composition according to the present invention onto a substrate to form a coating layer and curing the coating layer at a temperature in the range from 20° C. to 100° C.

Substrates

In the method of the present invention a wide variety of materials can be used as substrates. Preferably the substrate materials are chosen from the group consisting of metals, polymers, wood, glass, mineral-based materials and composites of any of the afore-mentioned materials.

The term metal comprises metallic elements like iron, aluminum, zinc, copper and the like as well as alloys such as steel like cold-rolled steel, galvanized steel and the like. Polymers can be thermoplastic, duroplastic or elastomeric polymers, duroplastic and thermoplastic polymers being preferred. Mineral-based materials encompass materials such as e.g. hardened cement and concrete. Composite materials are e.g. fiber-reinforced polymers etc.

Of course, it is possible to use pre-treated substrates, where the pre-treatment regularly depends on the chemical nature of the substrate.

Preferably, the substrates are cleaned before use, e.g. to remove dust, fats, oils or other substances which typically prevent a good adhesion of coatings. The substrate can further be treated with adhesion promoters to increase the adhesion of subsequent coatings.

Metallic substrates may comprise a so-called conversion coat layer and/or electrodeposition coat layer before being coated with the coating composition according to the present invention.

For polymeric substrates pretreatment may include, for example, treatment with fluorine, or a plasma, corona or flame treatment. Often the surface is also sanded and/or polished. The cleaning can also be done manually by wiping with solvents with or without previous grinding or by means of common automated procedures, such as carbon dioxide cleaning.

Any of the above substrates can also be pre-coated with one or more fillers and/or one or more basecoats prior to the formation of the coating layer. Such fillers may contain color pigments and/or effect pigments such as metallic effect pigments as e.g. aluminum pigments; or pearlescent pigments as e.g. mica pigments.

Application

The coating composition of the invention can be applied by any of the customary application methods, such as spraying, knife coating, brushing, flow coating, dipping, impregnating, trickling or rolling, for example. The substrate to be coated may itself be stationary, with the application equipment or unit being in motion. Alternatively, the substrate to be coated, especially a coil, may be in motion, with the application unit being stationary relative to the substrate or being in appropriate motion.

On industrial scale it is preferred to employ spray application methods, such as compressed-air spraying, airless spraying, high-speed rotation, or electrostatic spray application (ESTA).

Curing

Curing of the coating layer may take place after a certain rest time. This rest time is used, for example, for the leveling and degassing of the coating films or for the evaporation of solvents. The rest time may be assisted and/or shortened by application of elevated temperatures, provided that this does not entail any damage or change to the coating films, such as premature complete crosslinking.

The curing of the coating compositions has no particular features as far as its method is concerned, but instead takes place in accordance with the conventional methods such as heating in a forced-air oven or exposure to IR lamps. Curing may also take place in stages. Another preferred curing method is that of curing with near infrared (NIR) radiation. Curing takes place advantageously at a temperature of 20 to 100° C., more preferably 30 to 90° C. and most preferably 40 to 80° C. or 50 to 70° C., for a time of 2 min to 2 h, more preferably 3 min to 1 h and in particular 5 min to 30 min. Relative humidity during application should be preferably from 25 to 45, more preferred 30 to 35%.

The coating compositions of the invention provide new cured coatings, especially clear coats, moldings, especially optical moldings, and self-supporting sheets which are of high scratch resistance and in particular possess solvent stability. The coatings and coating systems of the invention, especially the clear coats, can also be produced in particular in coat thicknesses >100 μm without incidence of stress cracks.

Coated Substrates

Further object of the present invention are coated substrates, which are obtainable by the method according to the invention.

Depending on the substrate material chosen, the coating compositions can be applied in a wide variety of different application areas. Many different kinds of substrates can be coated to improve scratch resistance and solvent resistance.

The coating compositions of the invention are therefore outstandingly suitable for use as decorative and protective coating systems, possessing high scratch resistance, on bodies of means of transport (especially motor vehicles, such as motorcycles, buses, trucks or automobiles) or parts thereof; on constructions, interior and exterior; on furniture, windows and doors; on plastics moldings, especially CDs and windows; on small industrial parts, on coils, containers, and packaging; on white goods; on sheets; on optical, electrical and mechanical components, and on hollow glassware and articles of everyday use.

Multilayer Coatings and Multilayer-coated Substrates

Yet another object of the present invention is a multilayer coating consisting of at least two coating layers, at least one of which is formed from a coating composition according to the present invention.

Typically, the multilayer coating comprises more than two coating layers.

A preferred multilayer coating comprises at least a base coat layer and a clear coat layer. The coating compositions of the present invention preferably form the clear coat layer.

Even more preferred is a multilayer coating comprising at least one filler coat layer, coated with at least one base coat layer, which again is coated with at least one clear coat layer, the clear coat layer preferably being formed from the coating compositions of the present invention.

Particularly, but not limited to automotive coating a multilayer coating preferably comprises an electro coat layer, at least one filler coat layer on top of the electro coat layer, coated with at least one base coat layer, which again is coated with at least one clear coat layer, the clear coat layer preferably being formed from the coating compositions of the present invention.

The above multilayer coatings can be applied to any of the substrates named above, typically, but not limited to pre-treated substrates. Therefore, another object of the present invention is a multilayer-coated substrate, coated with any of the above multilayer coatings.

In the following examples section, the present invention will be further explained.

EXAMPLES

General Synthesis Example for (Meth)acrylic Polymers (A)

A reactor is loaded with 54,7 g of Solvent Naphtha and heated up to the desired polymerization temperature (145° C.). An initiator feeding to the reactor was started (solution of 12 g TBPEH in 10 g of Solvent Naphtha 160/180). After 15 min the monomer mixture was fed to the reactor (25 to 50 g of a (meth)acrylate monomer of formula (Ia), 35 to 60 g of a (meth)acrylate monomer of formula (IIIa), and 10 to 20 g of a (meth)acrylate monomer of formula (IVa), all three types of (meth)acrylate monomers in sum adding up to 100 g of a monomer mixture). The monomer feeding was stopped after a period of 4 h. After an additional period of 30 min the feeding of the initiator solution was stopped. After an additional post polymerization phase over 2 h at 145° C. the polymer solution was cooled down to room temperature.

The solids content was approximately 61 wt. % and was determined in a triple determination by drying for 1 hour at 130° C. and averaging the results.

Examples A1 and A2 are (meth)acrylic polymers obtained according to the above general synthesis procedure having the same content by weight of the (meth)acrylate monomer of formulas (Ia), (IIIa) and (IVa), but using different (meth)acrylate monomers of formula (IIIa), resulting in different glass transition temperatures of the polymers and different weight-average molecular weights.

Determination of the Glass Transition Temperature of (A)

The glass transition temperature of resins is commonly determined by DSC measurements. Appropriate samples are prepared by application of the liquid resin on a glass plate with a layer thickness of approx. 50 μm and subsequent drying at e.g. 130° C. for e.g. 30 min. A small portion of the dried film is brought into a DSC crucible (aluminum, non-hermetic). The crucible is sealed with a lid by manual pressing. Sample crucibles are then mounted in the calorimeter (Q2000 by TA Instruments). Measurements include a first heating run from −90° C. up to 100° C. with a heating rate of 10 K/min, a cooling run from 100° C. down to −90° C. with a cooling rate of 10 K/min and a second heating run from −90° C. up to 100° C. with a heating rate of 10 K/min. During the measurements, samples are under inert atmosphere ensured by constant nitrogen flow. Glass transition temperatures are assigned to the temperature at which the measured heat flow signal of the second heating run is intersected by a line that is equidistant to the two extrapolated baselines (half-step-height method according to EN ISO 11357).

TABLE 1

|  | A1 | A2 |
|---|---|---|
| methacryloxymethyl trimethoxysilane | 37.2 g | 37.2 g |
| cyclohexyl methacrylate | 47.1 g | — |
| n-butyl methacrylate | — | 47.1 g |

TABLE 1-continued

|  | A1 | A2 |
|---|---|---|
| styrene | 15.7 g | 15.7 g |
| glass transition temperature $T_g$ | 16° C. | −26° C. |
| weight-average molecular weight $M_w$ | 3520 | 5200 |

Further variants of A1 ("high $T_g$" polymer) and A2 ("low $T_g$" polymer) were synthesized according to the above general synthesis procedure and are summarized in Table 2.

TABLE 2

|  | A3 | A4 | A5 | A6 |
|---|---|---|---|---|
| methacryloxymethyl trimethoxysilane | 28.0 g | 28.0 g | 47.0 g | 47.0 g |
| cyclohexyl methacrylate | 56.3 g | — | 37.3 g | — |
| n-butyl methacrylate | — | 56.3 g | — | 37.3 g |
| styrene | 15.7 g | 15.7 g | 15.7 g | 15.7 g |

Coating Compositions

Inventive coating composition (I1) and comparative coating compositions (C1 to C5) were obtained by providing a solution of a levelling agent (0.005 g) in butyl acetate (11.63 g) and adding the metal containing catalysts, where employed in the coating compositions, in an amount such that 20 mmol of total metal was used based on the total weight of the solids content of the (meth)acrylic polymer A1 (25.25 g). The (meth)acrylic polymer (A) was added last and the ready-to-use coating composition was used within 30 min from manufacture.

Inventive coating composition I1 makes use of lithium neodecanoate stabilized with neodecanoic acid. Where the information is available, the amount of metal salt of neodecanoic acid and free neodecanoic acid are separately shown in Table 3. In Comparative Example C1 no catalyst was used and in Comparative Example C2 only neodecanoic acid was used which is typically contained in the commercially available metal salts of neodecanoic acid as a stabilizer (see the above comment on lithium neodecanoate). In Comparative Examples C3, C4 and C4 the neodecanoic acid salts of bismuth (C3), zinc (C4) and zirconium (C5) are used. For C4 and C5 the amounts of free neodecanoic acid were not calculable since zinc neodecanoate in Comparative Example C4 further contains isopropanol beside the free neodecanoic acid in an unknown amount and in Comparative Example C5 the ratio of divalent to tetravalent zirconium is not known, therefore not allowing to calculate the amount of free neodecanoic acid.

Table 3 gives an overview of the coating compositions

|  | I1 | C1 | C2 | C3 | C4 | C5 |
|---|---|---|---|---|---|---|
| (A)[1] | 25.25 g | 25.25 g | 25.25 g | 25.25 g | 25.25 g | 25.25 g |
| (B) or non-inventive catalyst | 0.89 g | — | — | 3.61 g | 6.41 g[#] | 2.53 g[##] |
| (C)[2] | 27.77 g | 27.77 g | 27.77 g | 27.77 g | 27.77 g | 27.77 g |
| (D)[3] | 0.85 g | — | 0.86 | 0.93 | # | ## |
| (E)[4] | 0.005 g | 0.005 g | 0.005 g | 0.005 g | 0.005 g | 0.005 g |

[1]A1 (amount calculated as solvent-free)
[2]butyl acetate (11.63 g) and Solvent Naphtha (16.14 g)
[3]neodecanoic acid
[4]levelling agent (additive)
contains isopropanol and free neodecanoic acid in an unknown amount
contains free neodecanoic acid in an unknown amount.

Further to the above Comparative Examples C3, C4 and C5, which are chemically close to lithium neodecanoate, only differing in their metal atom, Comparative Examples C6 making use of dioctyl tin dilaurate (DOTL; 0.1 wt % on total weight of solids of the composition) and Comparative Examples C7, C8 and C9, making use of varying amounts of partially blocked phenyl phosphoric acid (75% blocked with tris-(2-ethylhexyl) amine)—in the following addressed as "PBP"—were investigated. Such catalysts are known to catalyze the crosslinking of hydrolysable silane groups.

The respective coating compositions are shown in Table 4.

TABLE 4

|  | C6 | C7 | C8 | C9 |
|---|---|---|---|---|
| (A)[1] | 25.20 g | 24.85 g | 24.48 g | 23.77 g |
| DOTL | 0.025 g | — | — | — |
| PBP | — | 0.762 g | 1.5 g | 2.92 g |
| (C)[2] | 8.66 g | 8.49 g | 8.36 g | 8.12 g |
| (C)[3] | 16.11 g | 15.89 g | 15.65 g | 15.19 g |
| (E)[4] | 0.012 g | 0.012 g | 0.012 g | 0.012 g |

[1]A1 (amount calculated as solvent-free)
[2]butyl acetate
[3]Solvent Naphtha
[4]levelling agent (additive)

Evaluation of Coatings formed from the Coating Compositions

The inventive and comparative coating compositions were coated with a doctor knife in a film thickness of 150 μm onto a metal panel, type Gardobond 26s/6800/OC (Chemetall, Frankfurt), coated with ED-Coat. Afterwards the formed coating was dried for 10 min at 60° C. in an oven. The thus coated panels were tested as follows.

Zapon Tack Test (ZTT)

An aluminum strip with a thickness of 0.5 mm, a width of 2.5 cm, and a length of 11 cm is bent at an angle of 110° to give a surface measuring 2.5×2.5 cm. The long side of the metal plate is bent, after a further 2.5 cm, by about 15°, so that the plate is just held in balance by a weight (5 g) placed in the center of the square area. For the measurement of the ZTT tack-free state, the bent plate is placed on the coating film and weighed down with a 100-g-weight for 30 seconds. Following removal of the weight, the coating is considered tack-free if the metal angle falls over within 5 s. The test is repeated at intervals (0, 15, 30 and 60 min after the film was dried as described above). Before the test is deployed, the film was cooled down for 5 minutes and the tackiness of the coating film was assessed qualitatively by touch.

Print Test (PT)

The coated metal panel is placed on a commercial laboratory balance. Using thumb pressure, the film is then loaded with a weight of 2 kg for 20 seconds. This test is repeated after 60 minutes. The coating is considered satisfactory if there is no visible thumb imprint on the coating film. The results are denoted as being "okay" (OK), if satisfactory, or "not okay" (NOK), if not satisfactory.

Finger Nail Test (FNT)

The fingernail test gives an impression with respect to the full cure of the coating film. It is tried to enter the film with the fingernail and to displace the film. Evaluation is based on the following criteria:

0=film is hard and cannot be entered with the fingernail
1=film is almost hard, slight intrusion is possible
2=film is soft and can be displaced with the fingernail
3=film is very soft, no fingerprint visible
4=film is sticky, fingerprint clearly visible
5=film is wet, no visible curing MEK Test (MEK)

The MEK test serves to determine the resistance of coating films to solvents (rub test). This test was performed 2 days after the above drying procedure. A piece of cotton compress (Art. No. 1225221 Lohmann & Rauscher Cotton Wool Gauze Compress both-sided 40 cm×5 m) is affixed with a rubber band to the head of an MEK hammer and then soaked with MEK. The hammer weighs 1200 g and has a handle with a placement area of 2.5 cm². The hammer is likewise filled with solvent, which runs continuously into the cotton compress. This guarantees that the compress is dripping wet throughout the test. The test specimen is rubbed once back and forth (=1 DR, one double rub) with the compress. The test distance here is 9.5 cm. 1 DR here is to be performed in 1 second. During this procedure, no additional force is exerted on the hammer. The top and bottom points of reversal at the edges of the test specimen are not evaluated. A count is made of the DRs needed to damage the coating film on the specimen, and this value and type of damage is reported. If such damage is not achieved by the time a maximum of 200 DRs have been reached, the test is terminated after a maximum of 200 DRs.

Table 5 summarizes the results of the above 4 tests for the inventive coating and the comparative coatings.

TABLE 5

|     |         | I1    | C1   | C2   | C3  | C4  | C5   | C6   | C7   | C8   | C9   |
|-----|---------|-------|------|------|-----|-----|------|------|------|------|------|
| ZTT | 0 min   | OK    | NOK  | NOK  | OK  | OK  | NOK  | NOK  | OK   | OK   | OK   |
|     | 15 min  | OK    | NOK  | NOK  | OK  | OK  | NOK  | NOK  | OK   | OK   | OK   |
|     | 30 min  | OK    | NOK  | NOK  | OK  | OK  | NOK  | NOK  | OK   | OK   | OK   |
|     | 60 min  | OK    | NOK  | NOK  | OK  | OK  | NOK  | OK   | OK   | OK   | OK   |
| PT  | 30 min  | OK    | NOK  | NOK  | OK  | OK  | NOK  | NOK  | NOK  | NOK  | OK   |
|     | 60 min  | OK    | NOK  | NOK  | OK  | OK  | NOK  | NOK  | NOK  | OK   | OK   |
| FNT | 30 min  | 0     | 3-4  | 3-4  | 1   | 1-2 | 4    | 2    | 1-2  | 1    | 1    |
|     | 60 min  | 0     | 3-4  | 3-4  | 1   | 1-2 | 4    | 2    | 1-2  | 1    | 0-1  |
| MEK | after 2 d | >200[a] | 0.5 | 2 | 55[b] | 11[b] | 6 | 2 | 15 | 25 | 50[c] |

[a] few scratches
[b] film ruptured
[c] delamination of the film

Comparative Example C1 shows that the lack of any catalyst leads to sticky films, failing the fingernail test and not even surviving one double rub. Almost the same result is observed if only free neodecanoic acid is used in the coating composition instead of a metal containing salt thereof (Comparative Example C2). While other metal salts of neodecanoic acid than the inventive lithium salt show some satisfactory coating results in the Zapon tack test and print test (C3: bismuth neodecanoate; C4: zinc neodecanoate), there is still a slight intrusion with a fingernail or even a slight displacement possible and they both fail the MEK test. The zirconium neodecanoate containing coating composition (Comparative Example C5) clearly fails all tests, as the DOTL containing coating composition does. With an increasing amount of PBP Comparative Examples C7 to C9 show improved characteristics in the print test, they still fail the fingernail test and MEK test.

The above results show that only the cured coating obtained from the coating composition I1 according to the present invention passes the Zapon tack test, the print test, the fingernail test as well as the MEK-double rub test.

Therefore, the results prove that the combination of an alkali metal salt of a carboxylic acid as claimed with the (meth)acrylate polymer (A) as claimed provide short curing times and high solvent resistance.

The second-best results were observed when using the non-inventive bismuth neodecanoate catalyzed Comparative Example C3. Therefore, this Comparative Example as well as the conventionally metal-catalyzed Example C6 were further compared with the Inventive Example I1 for their scratch resistance, further varying the amount of silane functional monomers of the (meth)acrylic polymer (A) (Examples A1 (37.2 wt. %), A3 (28 wt. %) and A5 (47 wt. %)).

The tested coating compositions are shown in Table 6.

TABLE 6

| Examples | Catalyst | (A) [wt.-% monomer (Ia) in (A)] |
|----------|----------|-------------------|
| I1 | 20 mmol | A1 [37.2 wt.-%] |
| I2 | Li-neodecanoate | A3 [28.0 wt.-%] |
| I3 | (on 100 g of (A)) | A5 [47.0 wt.-%] |
| C3 | 20 mmol | A1 [37.2 wt.-%] |
| C10 | Bi-neodecanoate | A3 [28.0 wt.-%] |
| C11 | (on 100 g of (A)) | A5 [47.0 wt.-%] |
| C6 | 0.1% DOTL | A1 [37.2 wt.-%] |
| C12 | (on 100 g of (A)) | A3 [28.0 wt.-%] |
| C13 |  | A5 [47.0 wt.-%] |

Inventive Examples I2 and I3 were made in accordance with Inventive Example I1, but using A3 and A5, respectively, instead of A1. Comparative Examples C10 and C11 were made in accordance with Comparative Example C3, but using A3 and A5, respectively, instead of A1. Comparative Examples C12 and C13 were made in accordance with Comparative Example C6, but using A3 and A5, respectively, instead of A1.

The scratch tests were carried out on coatings made from the compositions according Table 6 that were coated onto metal panels and dried for 10 min at 60° C. in an oven.

Scratch resistance was determined using the Crockmeter Test (CT) according to Daimler as described below.

Scratch test using a Linear Abrasion Tester (Crockmeter) (DIN 55654)

This standard specifies a procedure for determining the resistance of a coating to scratching caused by a linearly moving scratching material loaded over its entire surface. The process can also be applied to other material surfaces such as plastics, coatings and metals. With a linear lifting device (crockmeter), a loaded friction pin covered with agreed scratch material (9 μm and 2 μm polishing paper) was moved over the coating under the influence of an agreed scratch medium. In the motor version, a preselection counter for the double stroke number must be integrated and the drive must be designed so that the stroke frequency is (1.0±0.1) Hz. Ten (10) double strokes were carried out. The evaluation of the scratch mark was done directly by measuring the residual gloss.

Table 7 shows the results from the Crockmeter Test (residual gloss, without reflow).

TABLE 7

| (A) [wt.-% monomer (Ia) in (A)] | Example | 9 μm polishing paper [residual gloss in %] | 2 μm polishing paper [residual gloss in %] |
|---|---|---|---|
| A3 [28 wt.-%] | I2 | 24 | 78 |
| | C10 | 23 | 75 |
| | C12 | 22 | 72 |
| A1 [37.2 wt.-%] | I1 | 28 | 85 |
| | C3 | 25 | 84 |
| | C6 | 22 | 73 |
| A5 [47 wt.-%] | I3 | 83 | 97 |
| | C11 | 48 | 87 |
| | C13 | 35 | 76 |

As indicated in Table 7, the coatings obtained from the Inventive Examples retain a better residual gloss after carrying out the Crockmeter Test, when compared with the respective Comparative Examples making use of the same (meth)acrylic polymer (A) but different catalysts. Particularly, the (meth)acrylic polymer (A) containing (meth)acrylic monomers (Ia) in an amount being as high as 47 wt. %, based on the total weight of monomers used in the manufacture of the (meth)acrylic polymer (A) showed an excellent scratch resistance.

The invention claimed is:

1. A coating composition comprising
    (A) one or more (meth)acrylic polymers comprising moieties of formula (I);

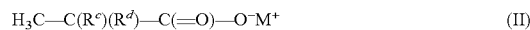

wherein
    $R^a$ is a methoxy group,
    $R^b$ is an alkyl group containing 1 to 4 carbon atoms or an alkoxy group containing 1 to 4 carbon atoms,
    x is 0 or 1, and
    the asterisk * denotes the position at which the moiety of formula (I) is attached to the polymeric backbone of the one or more (meth)acrylic polymers;

(B) one or more catalysts of formula (II);

$$H_3C—C(R^c)(R^d)—C(=O)—O^-M^+ \quad (II)$$

wherein
    Rc and Rd independently are alkyl groups containing 1 to 6 carbon atoms, with the proviso that the sum of the number of carbon atoms in residues Rc and Rd ranges from 2 to 7, and M denotes for Li, K or Na; and (C) one or more aprotic organic solvents.

2. The coating composition according to claim 1, wherein x=0 or $R^b$=methyl.

3. The coating composition according to claim 1, wherein the sum of the number of carbon atoms in residues $R^c$ and $R^d$ of the catalyst of formula (II) ranges from 5 to 7.

4. The coating composition according to claim 1, wherein the (A) one or more (meth)acrylic polymers further comprise moieties of formula (III);

$$*—C(=O)—O—R^e \quad (III);$$

wherein
    $R^e$ is a hydrocarbyl group selected from the group consisting of linear or branched alkyl groups; cycloalkyl groups; aryl groups; and aralkyl groups;
    or
    $R^e$ is an alkoxyalkyl group,
    and the asterisk * denotes the position at which the moiety of formula (III) is attached to the polymeric backbone of the one or more (meth)acrylic polymers;
    and/or
    moieties of formula (IV)

$$*—R^f \quad (IV)$$

wherein
    $R^f$ is an aryl group containing 6 to 10 carbon atoms, and the asterisk * denotes the position at which the moiety of formula (IV) is attached to the polymeric backbone of the (meth)acrylic polymer.

5. The coating composition according to claim 4, wherein the moieties of formula (I) origin from a (meth)acrylate monomer of formula (Ia)

$$H_2C=CR^g—C(=O)—O—CH_2—Si(R^a)_{3-x}(R^b)_x \quad (Ia)$$

$R^g$ being H or $CH_3$;
    the moieties of formula (III) origin from a (meth)acrylate monomer of formula (IIIa)

$$H_2C=CR^g—C(=O)—O—R^e \quad (IIIa)$$

$R^g$ being H or $CH_3$; and
    the moieties of formula (IV) origin from a vinyl monomer of formula (IVa)

$$H_2C=CR^g—R^f \quad (IVa)$$

$R^g$ being H or $CH_3$.

6. The coating composition according to claim 5, wherein the (A) (meth)acrylic polymer is obtained by polymerizing a mixture of
    i. 20 to 60 wt.-% of monomers of formula (Ia),
    ii. 25 to 65 wt.-% of monomers of formula (IIIa); and
    iii 5 to 25 wt.-% of monomers of formula (IVa);
    the amounts of monomers of formulas (Ia), (IIIa) and (IVa) summing up to at least 80 wt.-%, based on the total weight of ethylenically unsaturated monomers employed in the polymerization.

7. The coating composition according to claim 6, wherein the (A) (meth)acrylic polymer is obtained by polymerizing a mixture of
    i. 25 to 55 wt.-% of monomers of formula (Ia), ii. 30 to 60 wt.-% of monomers of formula (IIIa); and
iii. 10 to 20 wt.-% of monomers of formula (IVa);
the amounts of monomers of formulas (Ia), (IIIa) and (IVa) summing up to at least 90 wt.-%, based on the total weight of ethylenically unsaturated monomers employed in the polymerization.

8. The coating composition according to claim 6, wherein the amounts of monomers of formulas (Ia), (IIIa) and (IVa) summing up 100 wt.-%, based on the total weight of ethylenically unsaturated monomers employed in the polymerization.

9. The coating composition of claim 1, further comprising (D) one or more carboxylic acids of formula (V)

$$H_3C-C(R^h)(R^i)-COOH \quad (V)$$

wherein
R$^h$ and R$^i$ independently are alkyl groups containing 1 to 6 carbon atoms, with the proviso that the sum of the number of carbon atoms in residues R$^h$ and R$^i$ ranges from 2 to 7; and/or further comprising
(E) one or more coating additives selected from the group consisting of levelling agents, defoamers, slip additives, and UV absorbers.

10. The coating composition according to claim 9, comprising
35 to 60 wt.-% of the (A) one or more (meth)acrylic polymers of formula (I),
0.3 to 40 mmol of the (B) one or more catalysts of formula (II) per 100 g of (A),
at least 25 wt.-% of the (C) one or more aprotic solvents,
0 to 8 wt.-% of the (D) one or more carboxylic acids of formula (V), and
0 to 20 wt.-% of the (E) one or more coating additives;
all percentages being based on the total weight of the coating composition.

11. The coating composition of claim 1 being a clear coat composition.

12. A method of coating a substrate with a coating composition as defined in claim 1, the method comprising
i. applying the coating composition to a substrate to form a coating layer; and
ii. curing the coating layer at a temperature in the range from 20° C. to 100° C.

13. The method of claim 12, curing the coating layer at a temperature in the range from 40° C. to 80° C.

14. A coated substrate obtained according to the method of claim 12.

15. The coated substrate according to claim 14, being selected from the group consisting of bodies of means of transportation or parts thereof; interior or exterior constructions; furniture; windows; doors; plastics moldings; coils; containers; packaging; white goods; sheets; optical, electrical and mechanical components; glassware; and articles of everyday use.

16. A multilayer coating comprising at least two coating layers,
wherein at least one of the coating layers is formed from a coating composition according to claim 1.

17. A substrate, coated with a multilayer coating according to claim 16.

* * * * *